Patented Dec. 25, 1951

2,579,679

UNITED STATES PATENT OFFICE 2,579,679

STABLE VITAMIN B12 COMPOSITION

Marlin T. Leffler, Lake Bluff, Ill., assignor to Abbott Laboratories, North Chicago, Ill., a corporation of Illinois No Drawing. Application September 22, 1949, Serial No. 117,261

2 Claims. (Cl. 167—81)

This invention relates to vitamin solutions stabilized against decomposition, and more particularly to aqueous Vitamin $B_{12}$ solutions stabilized with thiodipropionic acid.

Therapeutic solutions containing Vitamin $B_{12}$ together with natural impurities, when subject to heat for sterilization or other purposes, rapidly lose their Vitamin $B_{12}$ potency. As the vitamin is generally administered as an injectable solution, it is important that the solution be sterile, and a standard and preferred method of sterilization of injectable solutions is by heat sterilization, usually autoclaving under steam pressure.

In accordance with the invention, the decomposition of Vitamin $B_{12}$ is prevented or at least greatly retarded by the incorporation therein of small amounts of 3-carboxyethyl mercaptopropionic acid (beta-beta thio-dipropionic acid) commonly referred to by the shorter name, thiodipropionic acid. This substance is known to be an effective antioxidant to prevent rancidity in soaps and foodstuffs, as pointed out in United States Patents 2,416,052; 2,457,227; 2,462,633. Its specific action in connection with Vitamin $B_{12}$ remains largely unknown at present. However, a large number of other anti-oxidants, which it was hoped or surmised might be effective to prevent heat decomposition of Vitamin $B_{12}$, were tested and found ineffective during the course of the investigation resulting in the discovery of the effectiveness of the compound and process described and claimed herein.

A solution of Vitamin $B_{12}$ prepared, for instance, as disclosed in application Serial No. 93,202, filed May 13, 1949, and containing 0.5% phenol, loses 30% of the vitamin potency on autoclaving at 10 pounds gauge steam pressure for about 10 minutes. However, if about 0.1% thiodipropionic acid is added to the solution of crystalline Vitamin $B_{12}$, there is no loss of potency under the same treatment. Likewise, a solution of Vitamin $B_{12}$, containing Vitamin $B_{12}$ amounting to about 4% of the dissolved solids, loses up to about 40% of its vitamin potency on autoclaving at 10 pounds steam pressure, but with 0.1% thiodipropionic acid added to the solution, no loss of vitamin potency is noted.

The stabilizing agent, thiodipropionic acid, is also valuable in protecting the Vitamin $B_{12}$ during the recovery of the vitamin from natural sources, and during the purification process thereafter. For instance, one source of the Vitamin $B_{12}$ is from the mycelium of the culture broth of Streptomyces griseus, and the vitamin is advantageously extracted from the mycelium with hot water. In extracting the vitamin from the mycelium, up to about 50% loss is incurred, but the addition of 0.1% thiodipropionic acid reduces the loss to less than 10%. Furthermore, the continued use of the stabilizing agent in the subsequent process of purification prevents destruction of the Vitamin $B_{12}$ during such purification and increases the overall yield.

The stabilizer may also be employed effectively when the solvent is partially or predominantly organic, so long as the solvent remains capable of dissolving the stabilizer.

I have found that the stabilizer may be used in amounts ranging from 0.001% to 1.0% by weight, but the preferred range is from 0.01% to 0.1%.

Others may readily adapt the invention for use under various conditions of service by employing one or more of the novel features involved, or equivalents thereof. As at present advised with respect to my invention, I desire to claim the following subject matter.

I claim:

1. A stable aqueous solution containing Vitamin $B_{12}$ as a significant ingredient, said solution containing thiodipropionic acid in an amount not less than about 0.001% nor more than 1.0% by weight as a stabilizing agent.

2. A stable aqueous Vitamin $B_{12}$ solution containing Vitamin $B_{12}$ as an active ingredient and at least about 0.001% thiodipropionic acid as a stabilizing agent.

MARLIN T. LEFFLER.

REFERENCES CITED

The following references are of record in the file of this patent:

UNITED STATES PATENTS

| Number | Name | Date |
|---|---|---|
| 2,416,052 | Gribbins | Feb. 18, 1947 |
| 2,457,227 | Gribbins | Dec. 28, 1948 |
| 2,462,633 | Gribbins | Feb. 22, 1949 |

OTHER REFERENCES

Manufacturing Chemist, September 1950, vol. 21, page 387.

Stokstad - Federation Proceedings (American Society of Biological Chemists), March 1949, page 257.

Science, December 3, 1948, vol. 108, page 634.

Girdwood-Lancet, August 20, 1949, page 346.